(12) United States Patent
Huang et al.

(10) Patent No.: US 9,466,029 B1
(45) Date of Patent: Oct. 11, 2016

(54) DEMOGRAPHIC INFERENCE CALIBRATION

(71) Applicant: Google Inc., Mountain View, CA (US)

(72) Inventors: Ruoyun Huang, Kirkland, WA (US); Arthur Asuncion, Bothell, WA (US); Yong Sheng, Kirkland, WA (US)

(73) Assignee: Google Inc., Mountain View, CA (US)

( * ) Notice: Subject to any disclaimer, the term of this patent is extended or adjusted under 35 U.S.C. 154(b) by 279 days.

(21) Appl. No.: 14/054,196

(22) Filed: Oct. 15, 2013

(51) Int. Cl.
G06N 7/00 (2006.01)
G06N 5/04 (2006.01)

(52) U.S. Cl.
CPC ................ *G06N 5/048* (2013.01); *G06N 7/00* (2013.01)

(58) Field of Classification Search
None
See application file for complete search history.

(56) References Cited

PUBLICATIONS

Liu, Sentiment Analysis and Opinion Mining, Morgan & Claypool Publishers, May 2012, pp. 1-168.*
Moore, et al., Active Learning for Node Classification in Assortative and Disassortative Networks, KDD'11, Aug. 21-24, 2011, pp. 841-849.*
Bi, Bin, Milad Shokouhi, Michal Kosinski, and Thore Graepel. "Inferring the Demographics of Search Users: When Social Data Met Search Queries". Microsoft Research; Cambridge, United Kingdom, 2013. (10 pages).
Mann, Gideon S. and Andrew McCallum. "Simple, Robust, Scalable Semi-supervised Learning via Expectation Regularization." Proceedings of the 24th International Conference on Machine Learning; Corvallis, OR, 2007. (9 pages).
Murray, Dan and Kevan Durrell. "Inferring Demographic Attributes of Anonymous Internet Users." SourceWorks Consulting; Quebec, Canada, 2000. (6 pages).

* cited by examiner

*Primary Examiner* — Wilbert L Starks
(74) *Attorney, Agent, or Firm* — Fish & Richardson P.C.

(57) ABSTRACT

Methods, systems, and apparatus include computer programs encoded on a computer-readable storage medium for labeling user identifiers. A method includes: identifying a set of unlabeled identifiers, wherein an unlabeled identifier has an unknown classification as to a particular class in a multi-class demographic characteristic; determining for each unlabeled identifier a probability as to inclusion in a class of the multi-class demographic characteristic based on known user behavior producing a distribution of probabilities for the unlabeled identifier; for a given unlabeled identifier, adjusting the probability based on a known internet distribution of entities with respect to a given class in the multi-class demographic characteristic and distribution of the probabilities among the unlabeled identifiers; and assigning a label for a particular class in the multi-class demographic characteristic to the unlabeled identifier in accordance with the adjusting.

19 Claims, 6 Drawing Sheets

DEMOGRAPHIC INFERENCE CALIBRATION

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for labeling user identifiers. A method includes: identifying a set of unlabeled identifiers, wherein an unlabeled identifier has an unknown classification as to a particular class in a multi-class demographic characteristic; determining for each unlabeled identifier a probability as to inclusion in a class of the multi-class demographic characteristic based on known user behavior producing a distribution of probabilities for the unlabeled identifier; for a given unlabeled identifier, adjusting the probability based on a known internet distribution of entities with respect to a given class in the multi-class demographic characteristic and distribution of the probabilities among the unlabeled identifiers; and assigning a label for a particular class in the multi-class demographic characteristic to the unlabeled identifier in accordance with the adjusting.

A method includes: identifying a set of unlabeled cookies, wherein an unlabeled cookie has an unknown classification as to a particular class in a multi-class demographic characteristic; determining, for each unlabeled cookie, a score that represents a likelihood that the cookie can be classified as being associated with a particular characteristic of the multi-class demographic characteristic; ranking all of the unlabeled cookies based on the scores, creating a ranking; determining an internet distribution for a given class of the multi class demographic characteristic; and for a given unlabeled cookie, assigning the unlabeled cookie to a class of the multi-class characteristic based on the rank of the unlabeled cookie and the internet distribution.

In general, another aspect of the subject matter described in this specification can be implemented in computer program products. A computer program product is tangibly embodied in a computer-readable storage device and comprises instructions. The instructions, when executed by a processor, cause the processor to: identify a set of unlabeled identifiers, wherein an unlabeled identifier has an unknown classification as to a particular class in a multi-class demographic characteristic; determine for each unlabeled identifier a probability as to inclusion in a class of the multi-class demographic characteristic based on known user behavior producing a distribution of probabilities for the unlabeled identifier; for a given unlabeled identifier, adjust the probability based on a known internet distribution of entities with respect to a given class in the multi-class demographic characteristic and distribution of the probabilities among the unlabeled identifiers; and assign a label for a particular class in the multi-class demographic characteristic to the unlabeled identifier in accordance with the adjusting.

In general, another aspect of the subject matter described in this specification can be implemented in systems. A system includes one or more processing devices and one or more storage devices storing instructions. The instructions, when executed by the one or more processing devices, cause the one or more processing devices to: identify a set of unlabeled identifiers, wherein an unlabeled identifier has an unknown classification as to a particular class in a multi-class demographic characteristic; determine for each unlabeled identifier a probability as to inclusion in a class of the multi-class demographic characteristic based on known user behavior producing a distribution of probabilities for the unlabeled identifier; for a given unlabeled identifier, adjust the probability based on a known internet distribution of entities with respect to a given class in the multi-class demographic characteristic and distribution of the probabilities among the unlabeled identifiers; and assign a label for a particular class in the multi-class demographic characteristic to the unlabeled identifier in accordance with the adjusting.

These and other implementations can each optionally include one or more of the following features. The multi-class demographic characteristic can include two classes. The multi-class demographic characteristic can include three or more classes. First and second superclasses can be defined that span the multi-classes wherein a given superclass can include one or more classes. A superclass associated with a given unlabeled identifier can be determined including determining a superclass probability as to inclusion in a given superclass. The superclass probability can be adjusted based on an internet distribution of entities with respect to a given superclass and the superclass probabilities of the unlabeled identifiers in the superclass. The given identifier can be assigned to one of the first or second superclass based on the adjusting. A class can be assigned to the given class of the classes that are included in the assigned superclass including the division of the assigned superclass into subclasses and the identification of a subclass to assign the given identifier based on internet probabilities of identifiers in the subclass and probabilities of unlabeled identifiers in a given subclass. The known user behavior can be derived from information contained in the identifier. The known user behavior can be derived from a profile associated with the unlabeled identifier. The label can be used to identify content for delivery to a user device that presented the identifier. An effectiveness of the assigning and revising adjustments made during the adjusting can be evaluated to account for the effectiveness. Unlabeled identifiers can be divided based on country of origin and one or more methods can be repeated for each country. Identifying can include capturing a plurality of unlabeled identifiers over a predetermined time period. The multi-class demographic characteristic can include three or more classes and a method can include combining classes to create a two class problem relating to a first and second superclass, solving the two class problem, and then repeating the process for an identified superclass or subclass until a single class is identified for assigning to a given unlabeled identifier.

Particular implementations may realize none, one or more of the following advantages. A probability for a user as to inclusion in a class of a multi-class demographic characteristic can be adjusted based on a known internet distribution of users with respect to a given class in the multi-class demographic characteristic and a distribution of probabilities among a group of users. Content to be provided to a user can be selected based at least in part on demographics inferred for the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A set of unlabeled identifiers (e.g., cookies) can be identified. Each unlabeled cookie can be associated with a user and can have an unknown classification as to a particular class in a multi-class demographic characteristic, such as gender or age. A probability can be determined for each unlabeled cookie as to inclusion in a particular class based on known user behavior producing a distribution of probabilities for the unlabeled cookies. For a given unlabeled cookie, the probability can be adjusted based on a known (e.g., benchmark) internet distribution of cookies with respect to a given class and the distribution of the probabilities among the unlabeled cookies. A label for a particular class in the multi-class demographic characteristic can be assigned to the unlabeled cookie in accordance with the adjusting.

For situations in which the systems discussed here collect information about users, or may make use of information about users, the users may be provided with an opportunity to control whether programs or features collect user information (e.g., information about a user's social network, demographics, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
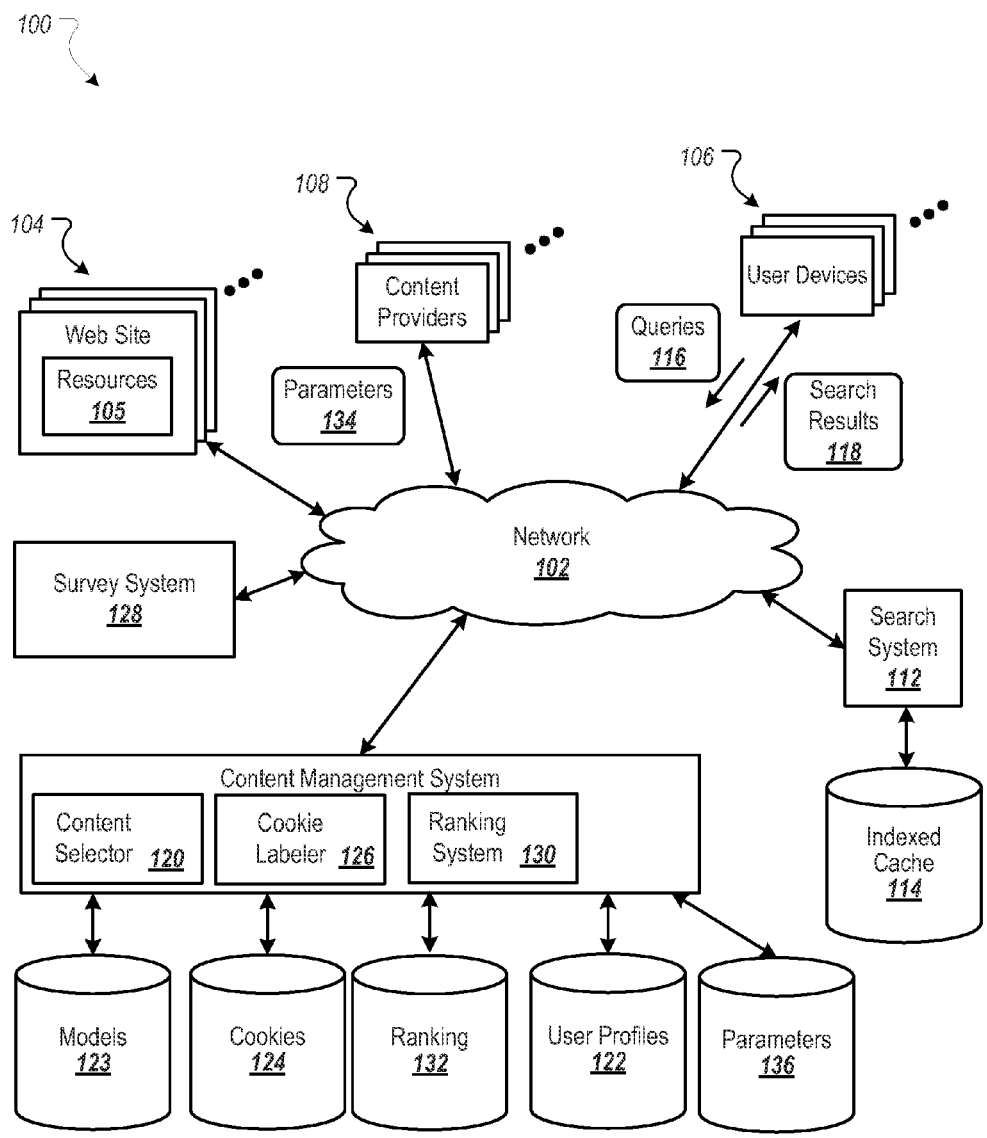
FIG. 1 is a block diagram of an example environment for labeling user identifiers.

FIG. 1 is a block diagram of an example environment 100 for labeling user identifiers. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116. The request for content can include a user identifier (e.g., a cookie) associated with the user of the requesting personal user device 106.

Based, for example, on data included in the request for content, a content selector 120 included in the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content selector 120. As yet another example, selection criteria can include criteria associated with a user identifier associated with the requesting user device 106. For example, the content selector 120 can select content items based on one or more interests or demographics associated with the user identifier, in cases where the user has consented to use of such information. One or more selected content items can be provided to the user device 106 in association with providing an associated resource 105 or search results 118.

In some implementations, the content selector 120 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

As mentioned, the content selector 120 can select content items based on demographic characteristics associated with a user identifier associated with the requesting user device 106. Demographic characteristics can include, for example, age or gender. A set of classes can be associated with each demographic characteristic. Some demographic characteristics can have two associated classes. For example, gender can have a male class and a female class. Some demographic characteristics can have more than two classes. For example, age can have six associated classes, where each class defines an age range (e.g., age classes can include 18-24, 25-34, 35-44, 45-54, 55-64, and 65+). Age can be referred to as an ordinal demographic characteristic, meaning a characteristic in which characteristic values and classes can be ordered, or ranked. In some implementations, a combined demographic characteristic can be defined which includes classes that are a combination of classes from two other respective demographic characteristics. For example, an age+gender demographic characteristic can be defined, with twelve associated classes including male/age 18-24, female/age 18-24, male/age 25-34, female age 25-34, etc.

The content selector 120 can, for example, access demographic information for a user from a user profiles data store 122. For example, the content selector 120 can query the user profiles data store 122 for demographic data using a user identifier (e.g., cookie) of the user, such as a user identifier that is included in a request for content. As another example, the content selector 120 can access user demographic information that is included in the cookie. Demographic information can, for example, be provided by the user (e.g., as declared data). As another example, demographic information can be inferred for the user. For example, the user profiles data store 122 can include information relating to user behavior within the environment 100, such as websites 104 visited, content items interacted with, or conversion actions (e.g., purchases) performed, etc.

In some implementations, a cookies data store 124 can include a set of unlabeled cookies, meaning cookies for users for which no demographic information has been provided or inferred. For example, the cookies data store 124 can include a set of new cookies (e.g., cookies less than a particular age). A cookie labeler 126 can, for example, on a periodic basis (e.g., daily, weekly), perform a labeling process to label the new or otherwise unlabeled cookies included in the cookies data store 124 with a label associated with a particular class for one or more demographic characteristics. For example, the cookie labeler 126 may assign a "male" label and a "25-34" label to a particular cookie.

The cookie labeler 126 can, for example, identify a set of unlabeled cookies in the cookies data store 124. Each unlabeled cookie can be associated with a user and can have an unknown classification as to a particular class in a multi-class demographic characteristic. The cookie labeler 126 can determine, for each unlabeled cookie, a probability as to inclusion in a class of the multi-class demographic characteristic based on known user behavior. For example, information indicating user behavior can be determined from information included in the cookie or information accessed from the user profiles data store 122, from activity logs (not shown), from information obtained from the search system 112, or from some other system. The determining of probabilities for the unlabeled cookies can produce a distribution of probabilities for the unlabeled cookies.

The distribution of probabilities inferred from the known user behavior can be skewed, as compared to a known (e.g., benchmark) or estimated internet distribution of entities. The cookie labeler 126 can adjust the distribution of probabilities to correct the skewing using, for example, a model. One or more models 123 that reflect an actual or expected distribution can be defined.

For example, the cookie labeler 126 can, for a given unlabeled cookie, adjust the probability as to inclusion in a class of the multi-class demographic characteristic based on a model that is based on the distribution of probabilities for the unlabeled cookies and on the known internet distribution of entities with respect to the class in the multi-class demographic characteristic. For example, the cookie labeler 126 can receive the known internet distribution for the class from a survey system 128. The survey system 128 can provide information, for example, related to a current population survey for people in general in a country or information related to other surveys which indicate characteristics of users of the environment 100 or internet users in general.

As a particular example, suppose that the probability for maleness for a particular unlabeled cookie based on known user behavior is sixty percent (with an inverse probability for femaleness for the cookie being forty percent). Suppose also that the known internet distribution of cookies as received from the survey system 128 indicates a likelihood that sixty five percent of internet cookies are associated with male users and that thirty five percent of internet cookies are associated with female users. The determined probability of sixty percent can be adjusted, using the model (e.g., adjusted upward toward 65%), based on the received probability of sixty five percent and also on the distribution of the determined probabilities of all of the processed unlabeled cookies. In some implementations, the adjustment can be of the form of a calibration where a linear interpolation is used to define a transform that maps from an expected distribution to a calibrated space. The transform for each segment of the feature (i.e., in a two segment feature such as gender) is even. In some implementations, a binning technique is used. That is, a mapping can be created of a number (e.g., a few thousand) of data points. For all the cookies not covered by the sampled data points, the system can calculate intercepts to get an approximated transformation. The cookie labeler 126 can assign a label (e.g., male) to the unlabeled cookie in accordance with the adjusting. The content selector 120 can use the label to identify content for delivery to a user device 106 that presented the cookie.

As a more specific example, a ranking system 130 can determine, for each unlabeled cookie, for example based on known user behavior, a score that represents a likelihood that the user associated with the cookie is included in a particular class of the multi-class demographic characteristic. The ranking system 130 can rank all of the unlabeled cookies based on the scores to create a ranking 132. The cookie labeler 126 can determine an internet distribution for a given class of the multi-class demographic characteristic, such as from information received from the survey system 128. The cookie labeler 126 can, for a particular unlabeled cookie, assign the unlabeled cookie to a class of the multi-class characteristic based on the rank of the unlabeled cookie and the internet distribution. For example, the cookie labeler 126 can identify one or more location(s) in the ranking 132 that defines a boundary (or boundaries) between classes using the internet distribution and can determine a class for the particular unlabeled cookie based on the rank of the unlabeled cookie relative to the identified location(s).

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 134 which define a content campaign. The content campaign can be created and activated for the content provider 108 according to the parameters 134 specified by the content provider 108. The campaign parameters 134 can be stored in a parameters data store 136. Campaign parameters 134 can include, for example, a campaign name, a preferred content network for placing content, a budget for the campaign, start and end dates for the campaign, a schedule for content placements, content (e.g., creatives), bids, and selection criteria.

Selection criteria can include, for example, a language, one or more geographical locations or websites, and/or one or more selection terms. Selection criteria can also include criteria that indicate that a content item can be eligible for selection by the content selector 120 when one or more characteristics of a user (e.g. interests, demographics) of a requesting user device 106 match interest or demographic criteria associated with the content item. For example, one or more labels assigned to a cookie included in a request for content received from the user device 106 can match a demographic characteristic (or class of a particular demographic characteristic) associated with the content item. Some or all of the labels assigned to the cookie can be labels assigned by the cookie labeler 126.

In some implementations, one or more models 123 are trained, for example, using labeled cookies from the cookies data store 124. Over time, the models 123 can be evaluated and adjusted. As described in more detail below, some models 123 may be tree-based models. Evaluation of the models 123 can include identifying a tree structure to use in a model that has a highest level of accuracy as compared to other tree structures.

Figure 2:
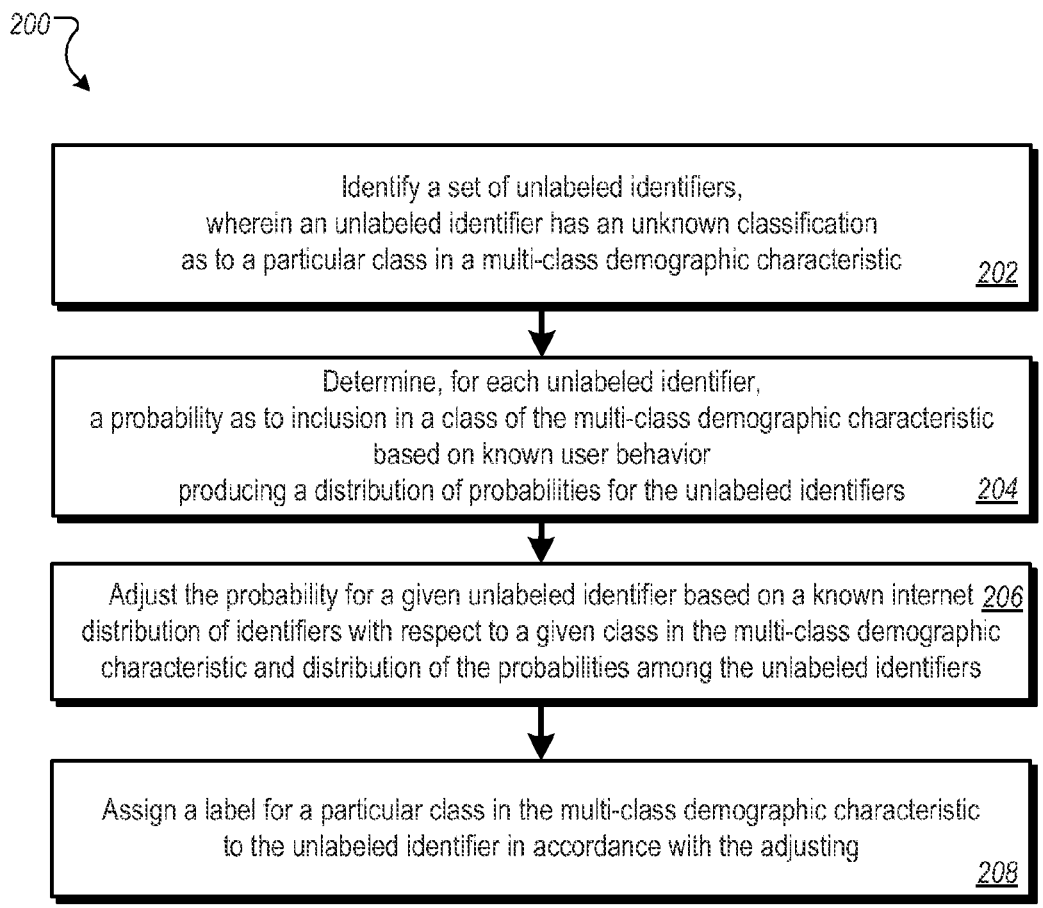
FIGS. 2, 3, and 4 are flowcharts of example processes for labeling user identifiers.

FIG. 2 is a flowchart of an example process 200 for labeling user identifiers. The process 200 can be performed, for example, by the content management system 110 described above with respect to FIG. 1.

A set of unlabeled identifiers (e.g., cookies) is identified (202), wherein an unlabeled identifier has an unknown classification as to a particular class in a multi-class demographic characteristic. For example, a plurality of unlabeled cookies (e.g., more than 100,000) can be captured over a predetermined time period, such as a day or a week. Some unlabeled cookies may have a label assigned for one or more demographic characteristics but may not have a label assigned for one or more other demographic characteristics. For example, an unlabeled cookie may be unlabeled with respect to age but may have a known classification (e.g., male) with respect to a gender demographic characteristic. A multi-class demographic can include, for example two classes (e.g., male and female). As another example, a multi-class demographic can include more than two classes. In some implementations, unlabeled cookies for a particular country are identified. The process 200 can be repeated, for example, for each of multiple countries.

A probability is determined for each unlabeled identifier as to inclusion in a class of the multi-class demographic characteristic based on known user behavior producing a distribution of probabilities for the unlabeled identifiers (204). The known user behavior can be derived, for example, from information contained in the identifier (e.g., cookie). As another example, the known user behavior can be derived from a profile associated with the cookie.

The probability is adjusted for a given unlabeled identifier based on a known internet distribution with respect to a given class in the multi-class demographic characteristic and distribution of the probabilities among the unlabeled identifiers (206). The known internet distribution (e.g., of cookies) can be based, for example, on survey information. An adjusted probability for a given unlabeled identifier can be determined using a function that is based on the known internet distribution and on the distribution of the probabilities among the unlabeled identifiers. In some implementations, a threshold probability is determined and used in the adjusting.

A label for a particular class in the multi-class demographic characteristic is assigned to the unlabeled identifier in accordance with the adjusting (208). For example, a label can be assigned to the unlabeled identifier using a function that is based on the adjusted probability.

Figure 3:
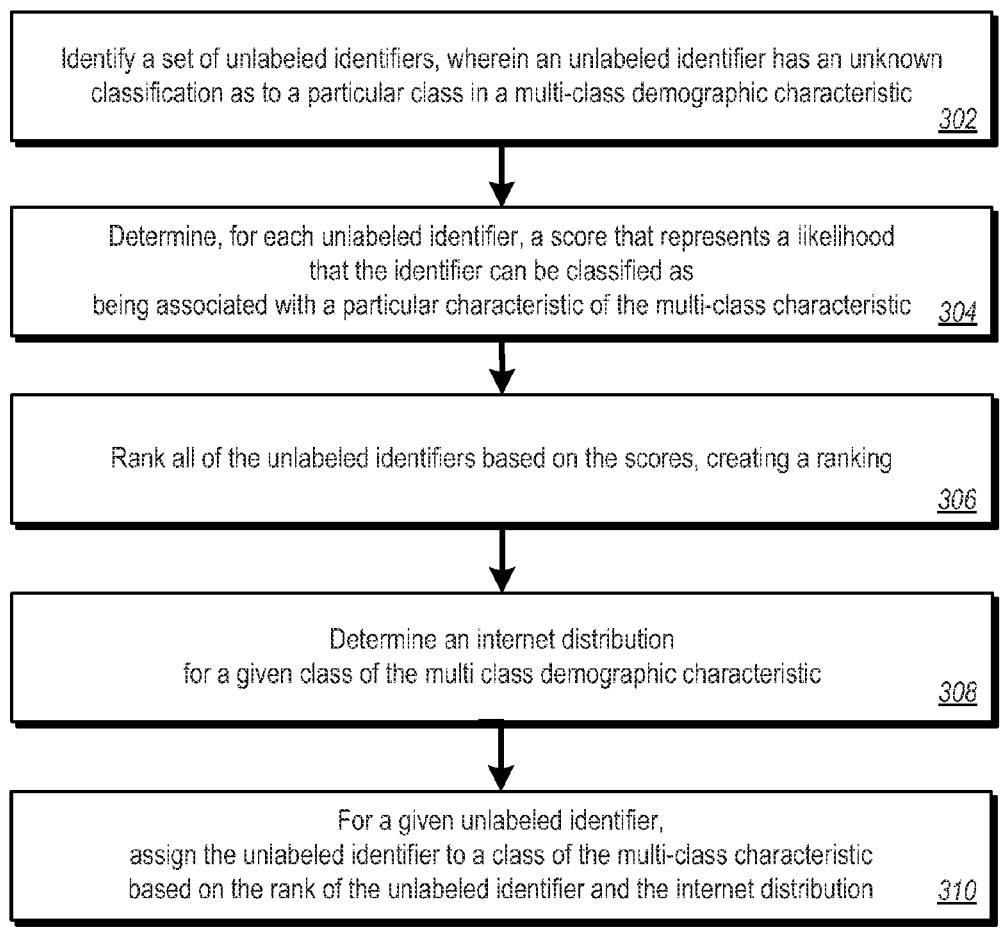

FIG. 3 is a flowchart of an example process 300 for labeling user identifiers. The method will be described in terms of unlabeled cookies, though other forms of unlabeled identifiers can be used. The process 300 can be performed, for example, by the content management system 110 described above with respect to FIG. 1.

A set of unlabeled cookies is identified (302), wherein an unlabeled cookie has an unknown classification as to a particular class in a multi-class demographic characteristic. In some implementations, unlabeled cookies for a particular country are identified. The process 300 can be repeated, for example, for each of multiple countries.

For each unlabeled cookie, a score is determined that represents a likelihood that the cookie can be classified as being associated with a particular characteristic of the multi-class demographic characteristic (304). A score for a particular unlabeled cookie can be based, for example, on known user behavior of the user associated with the unlabeled cookie. The known user behavior can be derived, for example, from information contained in the unlabeled cookie. As another example, the known user behavior can be derived from a profile associated with the cookie.

All of the unlabeled cookies are ranked based on the scores, creating a ranking (306). For example, the unlabeled cookies can be sorted, in ascending order, according to associated scores.

An internet distribution is determined for a given class of the multi class demographic characteristic (308). The internet distribution can be based, for example, on survey information.

For a given unlabeled cookie, the unlabeled cookie is assigned to a class of the multi-class characteristic based on the rank of the unlabeled cookie and the internet distribution (310). For example, a location in the ranking can be identified that defines a boundary between classes using the internet distribution. A class for the given unlabeled cookie can be determined based on the rank of the unlabeled cookie relative to the identified location.

For example, the internet distribution may indicate that sixty percent of internet users are male and forty percent of internet users are female. A location in the ranking corresponding to a sixtieth percentile score can be determined. If the rank of the unlabeled cookie is less than a rank corresponding to the identified location, the unlabeled cookie can be assigned to a male class. If the rank of the unlabeled cookie is greater than or equal to the rank corresponding to the identified location, the unlabeled cookie can be assigned to a female class.

Figure 4:
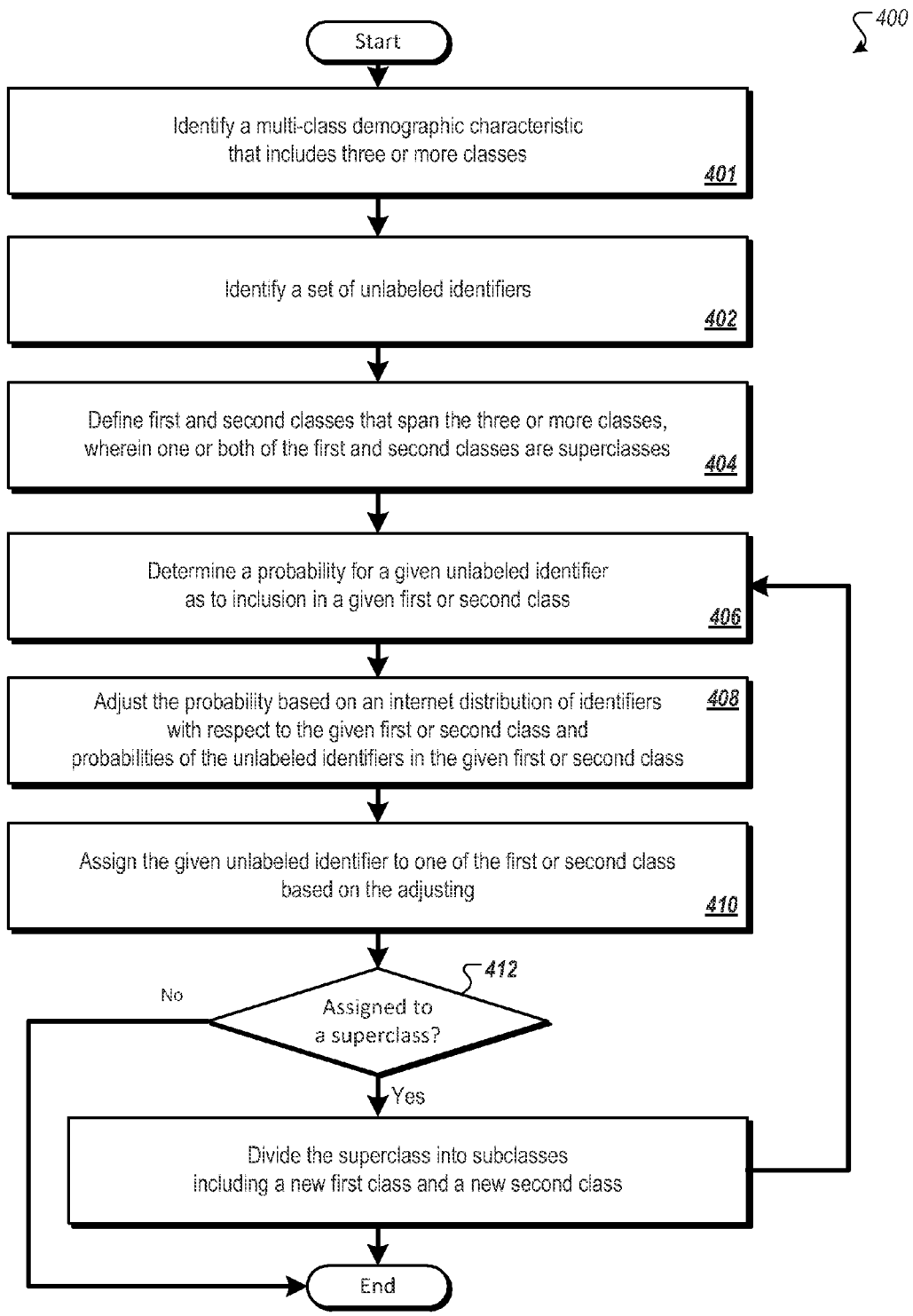

FIG. 4 is a flowchart of an example process 400 for labeling user identifiers. The process 400 can be performed, for example, by the content management system 110 described above with respect to FIG. 1. In general, the process 400 involves combining classes to create a two class problem relating to a first and second superclass of a multi-class demographic characteristic, solving the two class problem, and repeating processing for an identified superclass or subclass until a single class is identified for assigning to a given unlabeled cookie.

A multi-class demographic characteristic that includes three or more classes is identified (401). For example, as described above, an age demographic characteristic can include six classes corresponding to age ranges of 18-24, 25-34, 35-44, 45-54, 55-64, and 65+.

A set of unlabeled identifiers (e.g., cookies) is identified (402). For example, the cookies in the set of unlabeled cookies can be unlabeled with respect to the multi-class demographic characteristic.

Figure 5:
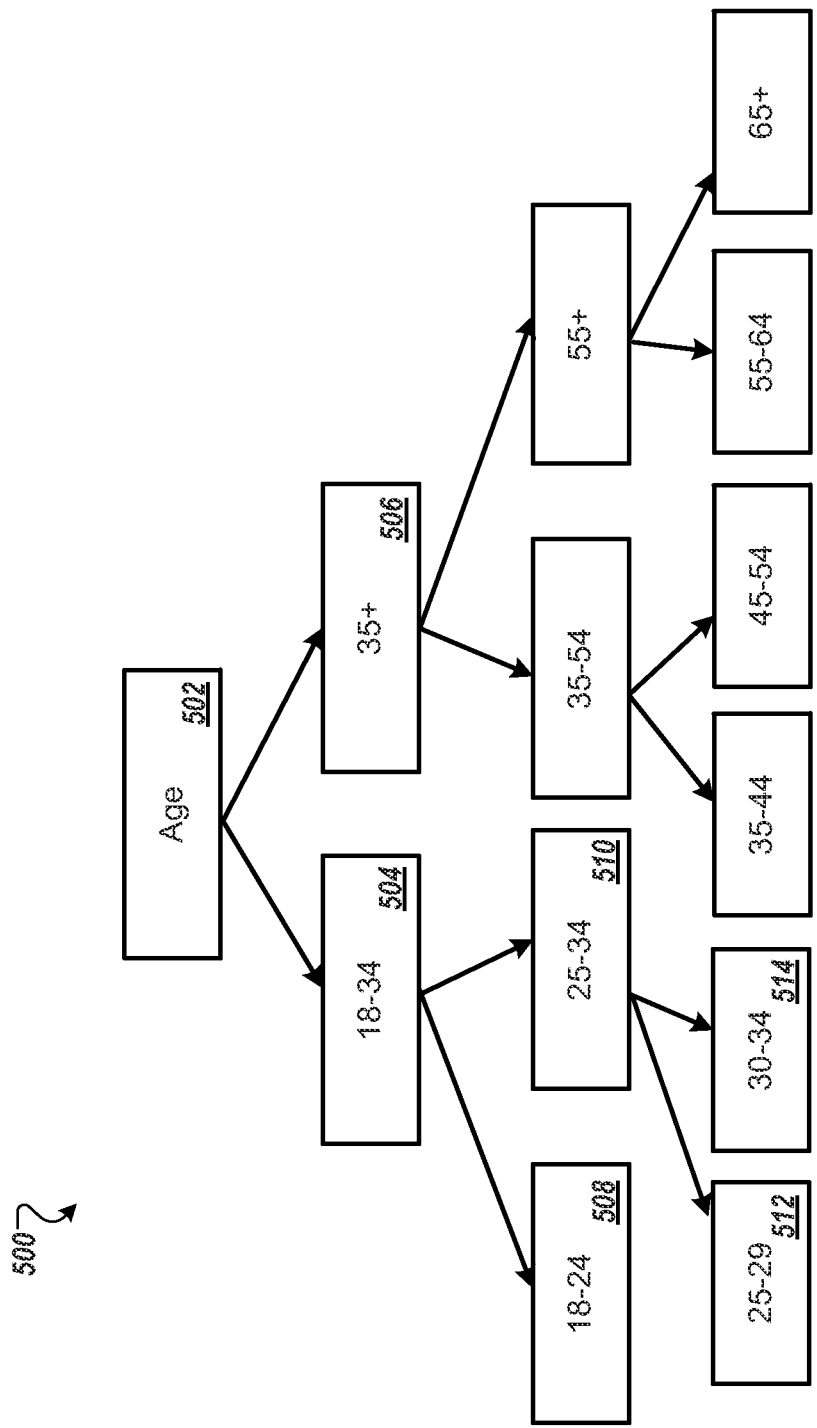
FIG. 5 illustrates an example tree structure associated with an age multi-class demographic characteristic.

First and second classes are defined that span the three or more classes, wherein one or both of the first and second classes are superclasses (404). For example, FIG. 5 illustrates an example tree structure 500 for an age multi-class demographic characteristic 502. A first class 504 of 18-34 and a second class 506 of 35+ can be defined. The first class of 18-34 and the second class of 35+ span the six age classes of 18-24, 25-34, 35-44, 45-54, 55-64, and 65+.

In some implementations, the tree structure 500 is selected from among other possible tree structures. For example, a determination can be made to split the tree structure 500 into the first class 504 of 18-34 and the second class 506 of 35+ instead of into classes representing some other split. For example, an optimization algorithm can be used that performs a random walk search to find a best tree structure, such as a tree structure that when applied results in a population closer to a benchmark distribution than other candidate tree structures and/or that results in a highest prediction accuracy as compared to other candidate tree structures.

Referring again to FIG. 4, a probability for a given unlabeled identifier as to inclusion in a given first or second class is determined (406). For example, a probability for the given unlabeled cookie as to inclusion in the first class can be determined based on known user behavior associated with the unlabeled cookie.

The probability is adjusted (408) based on a known or estimated internet distribution with respect to the given first or second class and the probabilities of unlabeled identifiers from the set of unlabeled identifiers that are associated with the given first or second class. For example, the probability can be adjusted as described above with respect to FIG. 2 and/or FIG. 3.

The given unlabeled identifier can be assigned to one of the first or second classes based on the adjusting (410). For example, the given unlabeled cookie can be assigned to the first class if the probability for the given unlabeled cookie as to inclusion in the first class is greater than the probability for the given unlabeled cookie as to inclusion in the second class. The probability for the given unlabeled cookie as to inclusion in the second class can be determined as an inverse probability of the probability as to inclusion in the first class. In the example of FIG. 5, the given unlabeled cookie can be assigned to the first class 504 corresponding to an age range of 18-34.

A determination is made as to whether the given unlabeled identifier has been assigned to a superclass. When the given unlabeled identifier has not been assigned to a superclass, the process 400 ends. That is, a determination has been made that the given unlabeled identifier has been assigned to a class that is not subdivided.

If the given unlabeled identifier has been assigned to a superclass, the superclass is divided into two subclasses including a new first class and a new second class. One or both of the new first and second classes may be superclasses. For example, referring again to FIG. 5, the class 504 (e.g., the previous first class) can be divided into a new first class 508 corresponding to an age range of 18-24 and a new second class 510 corresponding to an age range of 25-34.

After dividing the first class 504 into the new first class 508 and the new second class 510, the process 400 can continue, with the determination of a probability for the given unlabeled identifier as to inclusion in one of the new first class and the new second class (406), the adjusting of the probability (408), and the assigning of the given unlabeled identifier to one of the new first class or the new second class (410). In the example of FIG. 5, the given unlabeled cookie may be assigned to the new first class 508, in which case the process 400 ends with the given unlabeled cookie being assigned to the new first class 508 because the new first class 508 is not a superclass (e.g., 412 in the process 400). When the given unlabeled cookie is assigned to the new second class 510, processing can continue in a similar fashion, with identification of a third-iteration first class 512 and a third-iteration second class 514, with the given unlabeled cookie being ultimately assigned to either the third-iteration first class 512 or the third-iteration second class 514.

Figure 6:
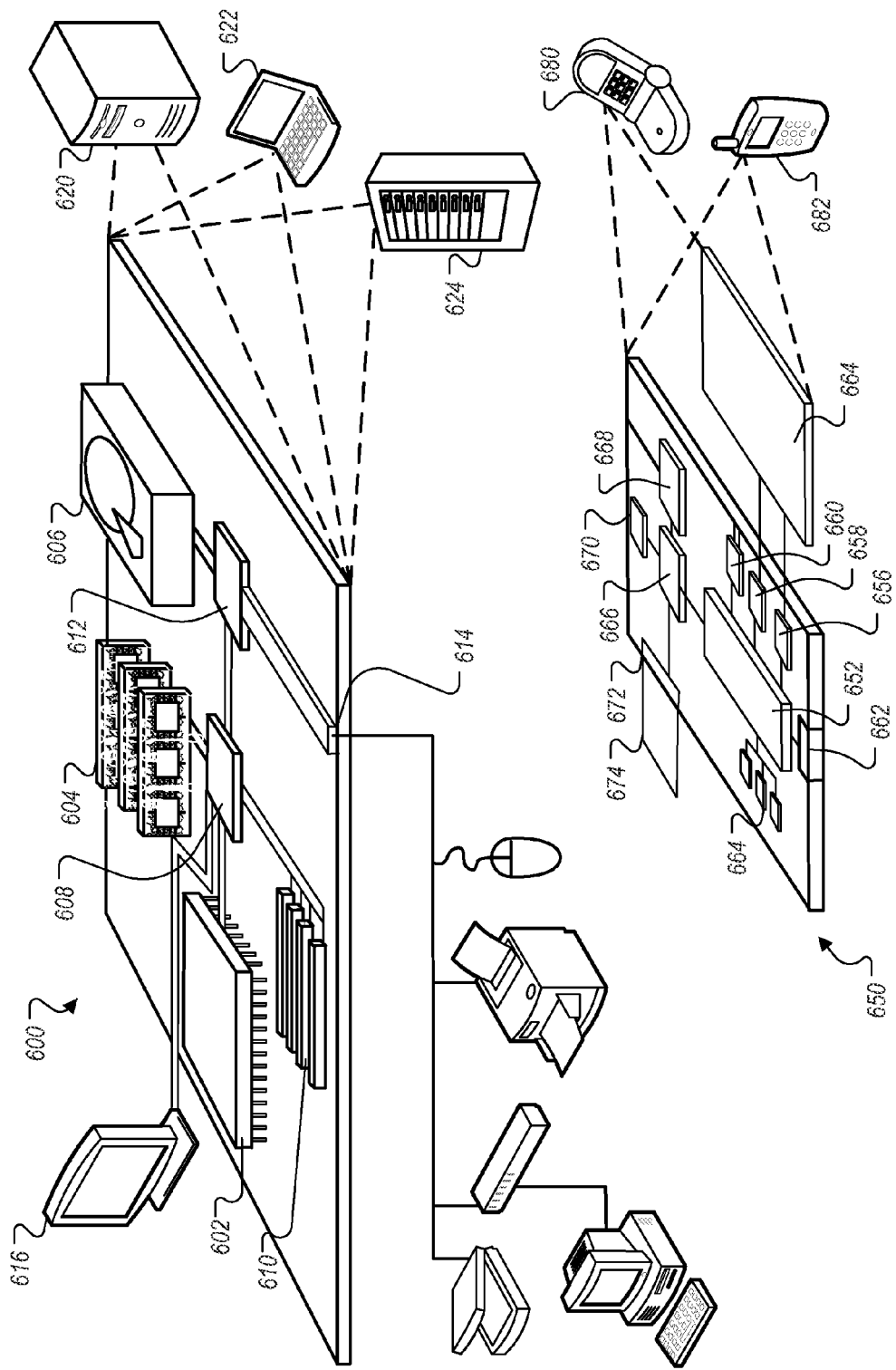
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
identifying a set of unlabeled identifiers associated with a particular user, wherein an unlabeled identifier has an unknown classification as to a particular class in a multi-class demographic characteristic;
for each unlabeled identifier of the set of unlabeled identifiers, producing a distribution of probabilities for the unlabeled identifier, including determining, for the unlabeled identifier, a probability of inclusion of the unlabeled identifier in the particular class of the multi-class demographic characteristic based on known behavior of the particular user;
ranking, for the particular class, the set of unlabeled identifiers based on the probability for each unlabeled identifier of the set of unlabeled identifiers;
determining an internet distribution of users with respect to the multi-class demographic characteristic based on characteristics of a current population survey of users;
based on the internet distribution of users with respect the multi-class demographic characteristic, determining a percentage of the users that are in each class of the multi-class demographic characteristic;
based on the percentage distribution of the users that are in each class of the multi-class demographic characteristic, defining, in the ranking of the set of unlabeled identifiers, a boundary between the rankings that are associated with each of two or more classes of the multi-class demographic characteristic, the two or more classes including the particular class;
for each unlabeled identifier of the set of unlabeled identifiers, adjusting the probability of inclusion in the particular class of the multi-class demographic characteristic based on the boundary; and
assigning a label of the particular class in the multi-class demographic characteristic to one or more of the unlabeled identifiers in accordance with the adjusting.

2. The method of claim 1 wherein the multi-class demographic characteristic includes two classes.

3. The method of claim 1 wherein the multi-class demographic characteristic includes three or more classes and wherein the method includes:
defining first and second superclasses that span the multi-classes wherein a given superclass includes one or more classes; and
determining a superclass associated with a given unlabeled identifier including:
determining a superclass probability as to inclusion in a given superclass;
adjusting the superclass probability based on an internet distribution of users with respect to a given superclass and the superclass probabilities of the unlabeled identifiers in the superclass; and
assigning the given identifier to one of the first or second superclass based on the adjusting.

4. The method of claim 3 further comprising assigning a class to the given class of the classes that are included in the assigned superclass including dividing the assigned superclass into subclasses and identifying a subclass to assign the given identifier based on internet probabilities of identifiers in the subclass and probabilities of unlabeled identifiers in a given subclass.

5. The method of claim 1 wherein the known behavior of the particular user is derived from information contained in the set of unlabeled identifiers.

6. The method of claim 1 wherein the known behavior of the particular user is derived from a profile associated with the set of unlabeled identifiers.

7. The method of claim 1 further comprising using the assigned label to identify content for delivery to a user device.

8. The method of claim 1 further comprising evaluating an effectiveness of the assigning.

9. The method of claim 1 wherein unlabeled identifiers are divided based on country of origin and wherein the method is repeated for each country.

10. The method of claim 1 wherein identifying includes capturing a plurality of unlabeled identifiers over a predetermined time period.

11. The method of claim 1 wherein the multi-class demographic characteristic includes three or more classes and wherein the method further includes combining classes to create a two class problem relating to a first and second superclass, solving the two class problem, then repeating the process for an identified superclass or subclass until a single class is identified for assigning to a given unlabeled identifier.

12. A method comprising:
identifying a set of unlabeled cookies associated with a particular user, wherein an unlabeled cookie has an unknown classification as to a particular class in a multi-class demographic characteristic;
for each unlabeled cookie of the set of unlabeled cookies, producing a distribution of probabilities for the unlabeled cookie, including determining, for the unlabeled cookie, a score that represents a likelihood that the unlabeled cookie is associated with the particular class of the multi-class demographic characteristic;
ranking, for the particular class, the set of unlabeled cookies based on the score for each unlabeled cookie of the set of unlabeled cookies;
determining an internet distribution of users with respect to the multi-class demographic characteristic, the internet distribution of users based on characteristics of a current population survey of users;
based on the internet distribution of users with respect the multi-class demographic characteristic, determining a percentage of the users that are in each class of the multi-class demographic characteristic;
based on the percentage distribution of the users that are in each class of the multi-class demographic characteristic, defining, in the ranking, a boundary between the rankings that are associated with each of two or more classes of the multi-class demographic characteristic, the two or more classes including the particular class; and
for a given unlabeled cookie, assigning the unlabeled cookie to one of the two or more classes of the multi-class characteristic based on the rank of the unlabeled cookie with respect to the boundary.

13. A computing system comprising:
one or more processing devices; and
one or more storage devices storing instructions that, when executed by the one or more processing devices, cause the one or more processing devices to:
identify a set of unlabeled identifiers associated with a particular user, wherein an unlabeled identifier has an unknown classification as to a particular class in a multi-class demographic characteristic;
for each unlabeled identifier of the set of unlabeled identifiers, produce a distribution of probabilities for the unlabeled identifier, including determining for the unlabeled identifier, a probability of inclusion of the unlabeled identifier in the particular class of the multi-class demographic characteristic based on known behavior of the particular user;

rank, for the particular class, the set of unlabeled identifiers based on the probability for each unlabeled identifier of the set of unlabeled identifiers;

determine an internet distribution of users with respect to the multi-class demographic characteristic based on characteristics of a current population survey of users;

based on the internet distribution of users with respect the multi-class demographic characteristic, determine a percentage of the users that are in each class of the multi-class demographic characteristic;

based on the percentage distribution of the users that are in each class of the multi-class demographic characteristic, define, in the ranking of the set of unlabeled identifiers, a boundary between the rankings that are associated with each of two or more classes of the multi-class demographic characteristic, the two or more classes including the particular class;

for each unlabeled identifier of the set of unlabeled identifiers, adjust the probability of inclusion in the particular class of the multi-class demographic characteristic based on the boundary; and assign a label of the particular class in the multi-class demographic characteristic to one or more of the unlabeled identifiers in accordance with the adjusting.

14. The system of claim 13 wherein the multi-class demographic characteristic includes two classes.

15. The system of claim 13 wherein the multi-class demographic characteristic includes three or more classes and wherein the one or more storage devices store instructions that, when executed by the one or more processing devices, cause the one or more processing devices to:

define first and second superclasses that span the multi-classes wherein a given superclass includes one or more classes; and determine a superclass associated with a given unlabeled identifier including:

determining a superclass probability as to inclusion in a given superclass;

adjusting the superclass probability based on internet distribution of users with respect to a given superclass and the superclass probabilities of the unlabeled identifiers in the superclass; and assigning the given identifier to one of the first or second superclass based on the adjusting.

16. The system of claim 15 wherein the one or more storage devices store instructions that, when executed by the one or more processing devices, cause the one or more processing devices to assign a class to the given class of the classes that are included in the assigned superclass including dividing the assigned superclass into subclasses and identifying a subclass to assign the given identifier based on internet probabilities of identifiers in the subclass and probabilities of unlabeled identifiers in a given subclass.

17. A computer program product tangibly embodied in a computer-readable storage device and comprising instructions that, when executed by a processor, cause the processor to:

identify a set of unlabeled identifiers associated with a particular user, wherein an unlabeled identifier has an unknown classification as to a particular class in a multi-class demographic characteristic;

for each unlabeled identifier of the set of unlabeled identifiers, producing a distribution of probabilities for the unlabeled identifier, including determining, for the unlabeled identifier, a probability of inclusion of the unlabeled identifier in the particular class of the multi-class demographic characteristic based on known behavior of the particular user;

rank, for the particular class, the set of unlabeled identifiers based on the probability for each unlabeled identifier of the set of unlabeled identifiers;

determine an internet distribution of users with respect to the multi-class demographic characteristic based on characteristics of a current population survey of users;

based on the internet distribution of users with respect the multi-class demographic characteristic, determine a percentage of the users that are in each class of the multi-class demographic characteristic;

based on the percentage distribution of the users that are in each class of the multi-class demographic characteristic, define, in the ranking of the set of unlabeled identifiers, a boundary between the rankings that are associated with each of two or more classes of the multi-class demographic characteristic, the two or more classes including the particular class;

for each unlabeled identifier of the set of unlabeled identifiers, adjust the probability of inclusion in the particular class of the multi-class demographic characteristics based on the boundary; and assign a label of the particular class in the multi-class demographic characteristic to one or more of the unlabeled identifiers in accordance with the adjusting.

18. The product of claim 17 wherein the multi-class demographic characteristic includes two classes.

19. The product of claim 17 wherein the known behavior of the particular user is derived from information contained in the set of unlabeled identifiers.

* * * * *